(12) United States Patent
Michaud

(10) Patent No.: US 6,464,272 B1
(45) Date of Patent: Oct. 15, 2002

(54) ONE HANDED SHOVEL FOR HANDICAPPED

(75) Inventor: Raymond Thomas Michaud, 21 Blanchard Rd., Springvale, ME (US) 04083

(73) Assignee: Raymond Thomas Michaud, Springvale, ME (US)

( * ) Notice: Subject to any disclaimer, the term of this patent is extended or adjusted under 35 U.S.C. 154(b) by 0 days.

(21) Appl. No.: 09/981,067

(22) Filed: Oct. 18, 2001

(51) Int. Cl.[7] ............................... B25G 1/06; A01B 1/22
(52) U.S. Cl. .............................. 294/58; 294/25; 16/430
(58) Field of Search ........................ 294/25, 57–59; 16/422, 426, 430

(56) References Cited

U.S. PATENT DOCUMENTS

| 309,437 | A | * | 12/1884 | Calef ........................... 294/58 |
| 712,843 | A | * | 11/1902 | Paul ............................ 173/168 |
| 2,482,589 | A | * | 9/1949 | Maguire ..................... 15/143.1 |
| 4,944,541 | A | * | 7/1990 | Waldschmidt ............... 16/426 |
| 5,451,085 | A | * | 9/1995 | Wagner ....................... 16/422 |
| 5,471,698 | A | * | 12/1995 | Francis et al. ............. 15/144.1 |
| 5,529,357 | A | * | 6/1996 | Hoffman ...................... 15/145 |
| 5,716,087 | A | * | 2/1998 | Backich et al. .............. 16/422 |
| 5,832,563 | A | * | 11/1998 | Simpson .................... 16/110.1 |
| 5,937,627 | A | * | 8/1999 | McKittrick ................. 172/378 |
| 6,082,795 | A | * | 7/2000 | Fornelli ....................... 16/422 |

FOREIGN PATENT DOCUMENTS

| GB | 2248034 | * | 3/1992 | .................. 294/58 |
| GB | 2298158 | * | 8/1996 | .................. 294/58 |

* cited by examiner

Primary Examiner—Dean J. Kramer

(57) ABSTRACT

This design is to be used by handicapped persons for the removal of snow. The invention is made to be used with one arm, and is adjustable to fit a short or tall person with only one aim or leg, left or right. It consists of a grip handle which is secured to two plates by bolts which are attached in turn to the main shaft by bolts, and is made adjustable by holes drilled into the main shaft. It also has a cradle at the upper end of the main shaft in which the forearm rests to give it stability and leverage to lift the loaded shovel for throwing snow. This cradle is attached to the main shaft by clamps which are also adjustable by releasing the bolts and moving it up and down on the shaft, which is also used to allow for use of different sized persons in unison with the adjustment of the grip handle.

1 Claim, 3 Drawing Sheets

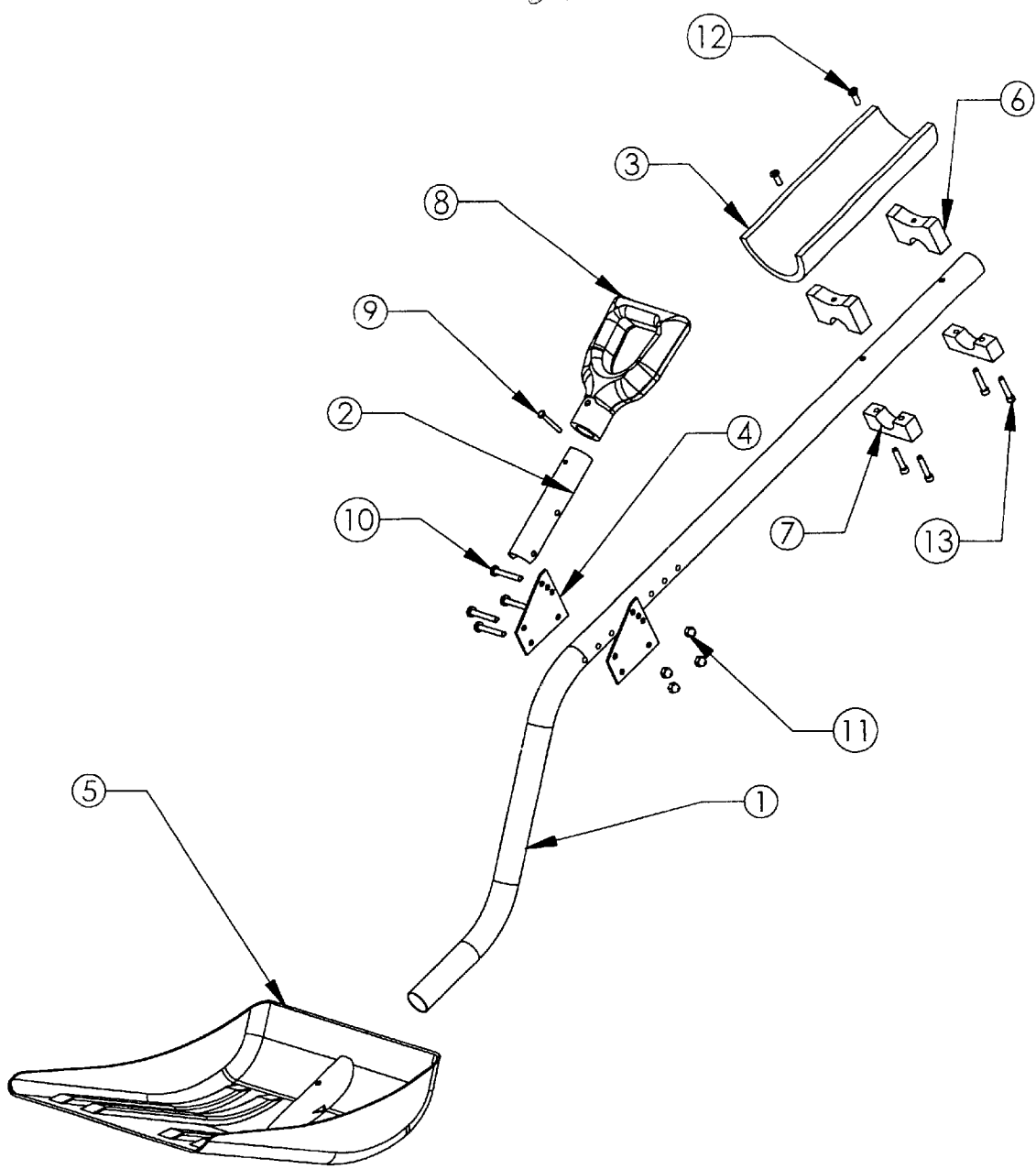

ONE HANDED SHOVEL FOR HANDICAPPED

BACKGROUND OF THE INVENTION

1. Field of the Invention

This shovel is intended to be used by a person who has lost the use of a limb through an accident, infirmity, or disease. It will enable the person to shovel snow with one arm while standing on a crutch, sitting in a wheel chair, or on both legs. It is also designed to be used with minimal bending and is adjustable to the height of the user.

2. Description of Prior Act

Todays shovels do not readily lend themselves for use by handicapped persons since they require the use of both hands. Whether scraping or shoveling snow, the user must use both hands and be standing in an upright position making it impossible for a one legged or one armed person to use properly. This shovel will allow the user to use one arm to do the above effectively.

In reference, I have looked into the following patents; U.S. Pat. No. 4,944,541 by Waldschmidt, U.S. Pat. No. 4,103,954 by Vaslas, U.S. Pat. No. 5,472,252 by Barone, U.S. Pat. No. 5,499,852 by Seigendall, U.S. Pat. No. 5,704,672 by Sims, and U.S. Pat. No. 5,918,921 by Samuelson, and found that all these shovels are to be used with both hands, thus the user would not be able to use these effectively to his or her demands.

SUMMARY OF THE INVENTION

I have looked into several makes and designs of different shovels and none of them address the problems associated with the handicapped situation described in the previous statements. These shovels are designed with one or two handles to be used while incorporating the use of both hands. The invention that I have designed will allow the person using the shovel to use it while standing on a crutch, crutches, sitting, or standing on both legs using one arm to shovel or scrape snow. The shovel is equipped with a grip handle attached to the main shaft, which in tun is made so that the user does not have bend over to any extreme to reach the surface he is trying to clear. The attached grip handle allows the user to grip it in a way that the form rests in a cradle at the upper end of the main shaft to give the user leverage to lift the load. This grip handle is also adjustable to the users height. This invention will empower certain handicapped individuals by enabling them to remove snow from walkways, sidewalks, etc.

BRIEF DESCRIPTION OF DRAWINGS

FIG. 3. Is an exploded view of the snow shovel for the handicapped showing how all the different parts are assembled to each other and attached to the main shaft.

DETAILED DESCRIPTION OF DRAWINGS

Figure 1:
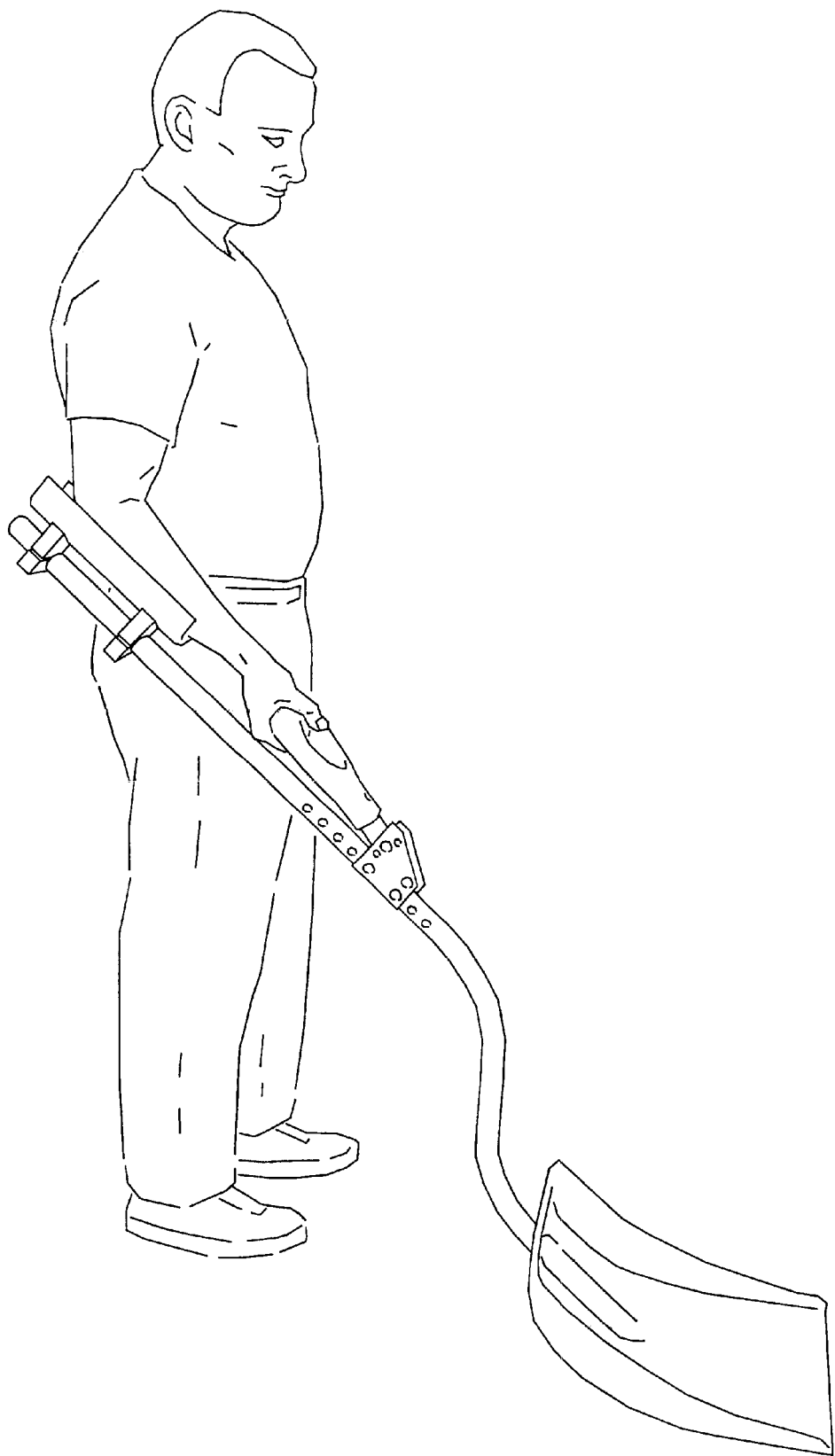
FIG 1. Is an illustration of the snow shovel for the handicapped being shown in the position it will be used to gather snow, using the fore arm in the cradle as leverage while gripping the auxiliary handle. Therefore the shovel and snow can be picked up and the snow thrown off.
Figure 2:
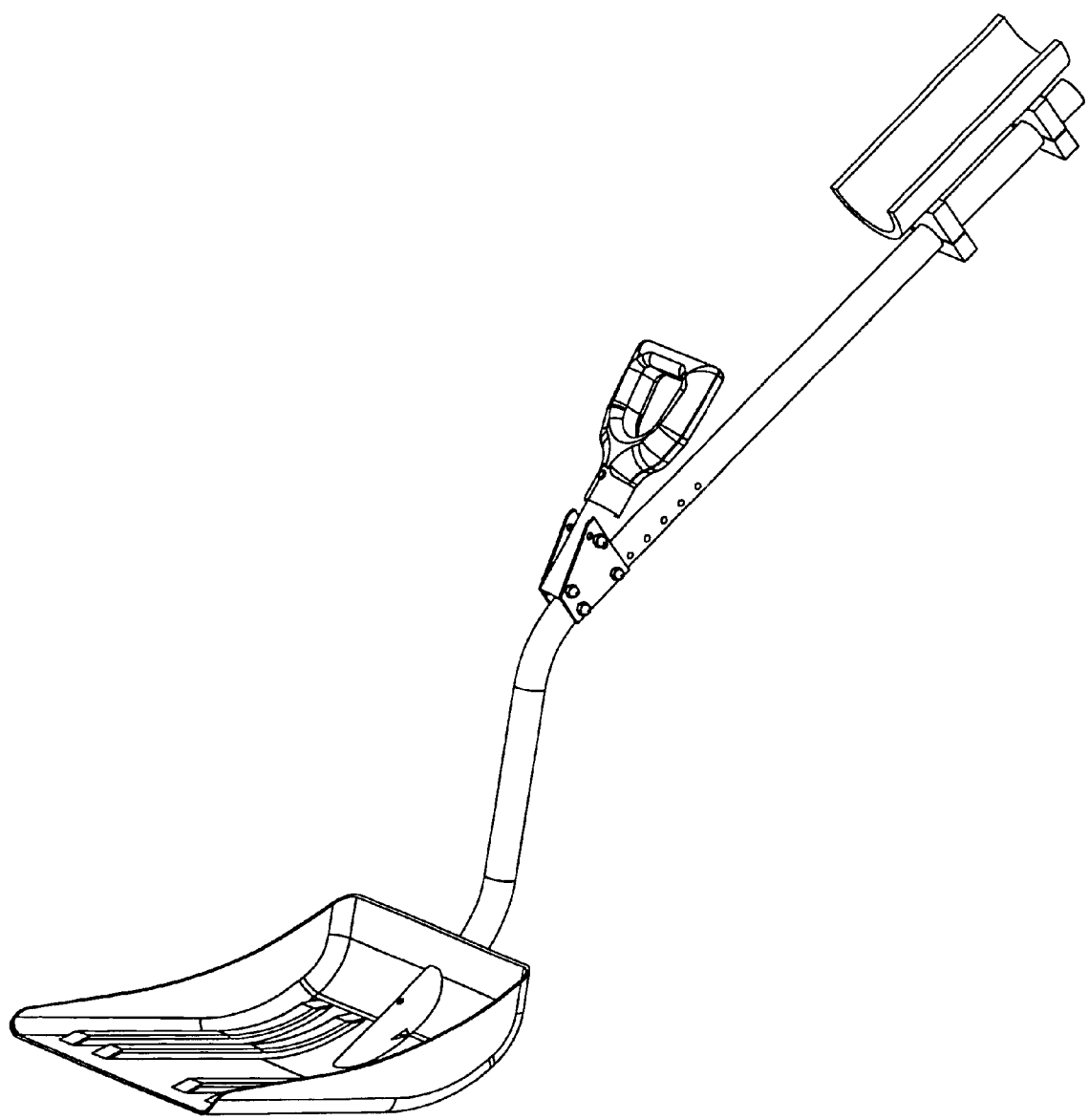
FIG. 2. Is a view of the snow shovel for the handicapped illustrating the auxiliary handle and shaft attached to the main shaft by means of the two plates. Also shown is the cradle attached to the main by means of the two clamps.

In reference to page 3 of drawings, No.(8) handle is attached to auxiliary shaft (2) by means of a pin (9) and then secured to the two plates (4) by bolts (10) and nuts (11). The plates are then secured to the main shaft (1) by bolts (10) and nuts (11). The cradle (3) is then mounted on clamp (6) by screws (12) and then on the main shaft (1) by clamping clamp (7) to clamp (6) to main shaft (1) by means of threaded bolts (13). The cradle is adjustable by loosening the threaded bolts (13) to move it up and down on the main shaft (1).

It will be understood that the foregoing description of the preferred embodiments of the present invention are for purposes of illustration only, and that various structural and operational features herein disclosed are susceptible to a number of modifications and changes, none of which entails any departure from the spirit and scope of the present invention as defined in the hereto appended claims. Accordingly, it should be clearly understood that the form of the present invention described above and shown in the accompanying drawings is illustrative only and is not intended to limit the scope of the present invention to less then that described in the claims.

What is claimed is:

1. A shovel for use by a person handicapped by the loss of a leg or arm, to shovel snow comprising of a main shaft having top and bottom ends with a shovel blade fastened to the bottom end of the main shaft, and an auxiliary shaft having top and bottom ends with a grip handle firmly attached to the top end of auxiliary shaft, and the auxiliary shaft is then connected to the main shaft by means of adjustable plates at the bottom end of the auxiliary shaft by bolts traveling through the plates and into and through the auxiliary shaft and secured on the opposite side with nuts, and then fastened to the main shaft by bolts traveling through said plates into and through the main shaft and secured to the main shaft by means of nuts attached to said bolts, and then a half round cradle is secured to two top clamps by screws passing through the cradle and into the top clamps the cradle being secured to the top clamps and adjustably secured to the main shaft by bottom clamps with bolts passing through bottom clamps and into the top clamps therefore pressing clamps to the main shaft tightly securing cradle and clamps to the main shaft, wherein the cradle is adjustable by releasing pressure on the clamps and moving the cradle up and down on the main shaft.

* * * * *